March 15, 1927.

M. TIBBETTS

MOTOR VEHICLE

Filed May 19, 1926

1,620,744

INVENTOR.

Milton Tibbetts

Patented Mar. 15, 1927.

1,620,744

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 19, 1926. Serial No. 110,144.

This invention relates to motor vehicles and particularly to brake operating mechanism therefor. The invention is especially adapted to four wheel brakes and it is shown as applied to a vehicle having a pair of front and a pair of rear brakes.

Most motor vehicles today have two separate means for operating the brakes of the vehicle, usually a hand lever and a foot lever. The foot lever is used as a service brake and the hand lever as the standing brake. It is also desirable that one brake may be used in case of the failure of the other for any reason as by breakage of a connecting part or by carelessness on the part of a workman in connecting the brake parts.

It is usually desirable that more braking effort shall be applied to the rear wheels of a vehicle than to the front wheels though sometimes the reverse is true, and various means for accomplishing one or the other arrangement have been used. This applies more particularly to the foot or service application of the brakes, it being sufficient usually to connect the hand lever to only two of the brakes, more often the rear wheel brakes.

Something more than the ordinary factor of safety is desirable in brake mechanism. Where unusual safeguards can be placed around the operation of a vehicle, the manufacturer is inclined to provide them. Too much duplication of parts is of course not desirable but where duplication of brake connections will serve a useful purpose in an emergency it is highly desirable to employ them.

It is one of the objects of the present invention to provide in connection with a brake mechanism such as above described, an additional means which will come into operation upon the failure of some of the parts normally connecting a brake lever with the brakes.

A further object of the invention is to provide a normally inoperative connecting link between one of the brake control levers and the brake mechanism whereby the front brakes may be operated upon impairment of the balanced action between the front and rear brakes.

Figure 1:
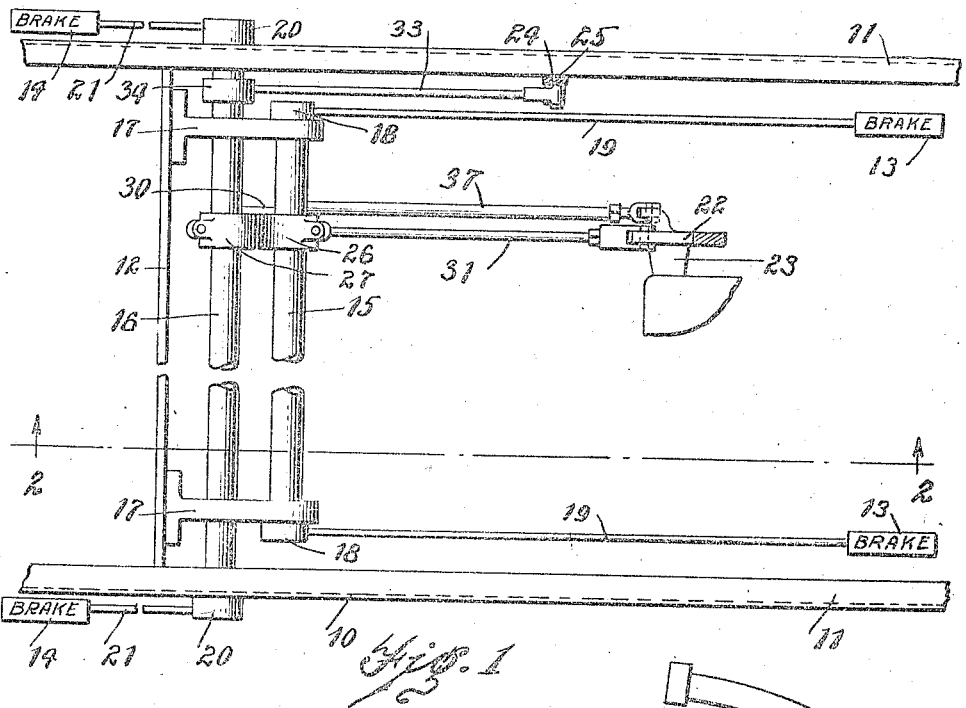
Figure 2:
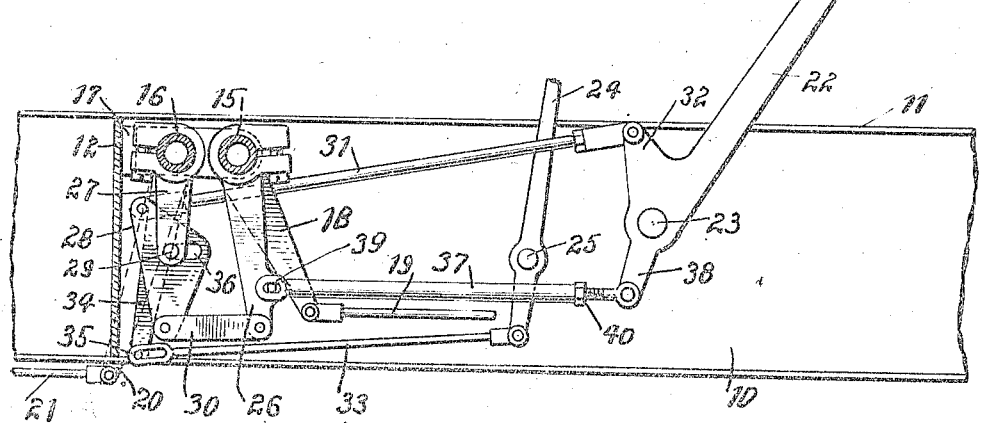

Other objects and advantages will appear from the following description taken in connection with the drawings illustrating a preferred embodiment of my invention and in which:

Fig. 1 is a plan view of the middle portion of a motor vehicle chassis with brake actuating mechanism embodying the invention; and Fig. 2 is an elevation and part section taken substantially on the line 2—2 of Fig. 1.

Referring to the drawings, 10 represents a motor vehicle frame comprising side bars 11 and a cross bar 12. In Fig. 1 the brakes of the vehicle are indicated diagrammatically as they may be of any desired construction. The front brakes are shown at 13 and the rear brakes at 14, and it is intended that these brakes shall be operated either simultaneously or in pairs independently, according to the conditions of use.

For operating the front pair of brakes there is a rock shaft 15 and for operating the rear brakes there is a rock shaft 16, these shafts being mounted in suitable brackets 17 connected to the frame. The rock shaft 15 preferably terminates just inside the side bars 11 of the frame and at each end there is an operating arm 18 connected as by a link 19 with the respective brakes 13, so that the rocking of the shaft will actuate those brakes. The rock shaft 16 preferably extends through the frame side bars and at each end there is an arm 20 and a link 21 connecting the arm with the respective brakes 14, so that the rocking of the shaft 16 actuates the brakes 14.

A foot lever 22 is conveniently arranged for the operator and is supported on any suitable part of the frame as by a bracket 23, and a hand lever 24 is pivotally supported on one of the frame side bars 11 as at 25.

The foot lever 22 is connected to normally operate the rock shafts 15 and 16 in substantial unison with balanced action between the shafts so that the brakes at one end of the vehicle may be actuated with slightly less pressure than those at the other end. The connections include a long arm 26 on the rock shaft 15, a shorter arm 27 on the rock shaft 16, a floating lever 28 pivotally connected between its ends to the end of the arm 27, as at 29, a link 30 connecting the end of the arm 26 with one end of the floating lever 28, and a rod 31 connecting the other end of the floating lever 28 with an arm 32 on the lever 22. With this mechanism it will be seen that when the lever 22 is operated the arms 26 and 27 will be drawn toward each other with balanced or constantly related action between them so that the shafts 15 and 16 are rocked and the front and rear brakes actuated. This is the normal operation of all four brakes of the vehicle and this mechanism is, generally speaking, termed the service brake.

For a standing brake, that is a brake to hold the vehicle when parked, the hand lever 24 is connected to one of the rock shafts, preferably the rock shaft 16, through a rod 33 and an arm 34, the latter being connected to the rock shaft 16. The rod 33 has a pin and slot connection 35 with the arm 34 so that the shaft 16 may be rocked by the foot lever without at the same time rocking the hand lever 24. Also, the pivotal connection 29 is in a slot 36 in the floating lever 28 so that the pin 29 may move in said slot 36 when the shaft 16 is rocked by the hand lever and thus cause no corresponding movement of the foot lever. Any usual or suitable means, not shown, for retaining the hand lever in its set position may be used.

With the above construction the rear brakes 14 may be actuated by the hand lever 24 regardless of what may happen to the described connections between the foot lever 22 and the rock shafts. In order that the front brakes may also be operated even though there should be a failure of some of the described connections to the rock shafts, a second connection is used from the foot lever 22 to the rock shaft 15. This connection is in the form of an adjustable compression rod 37 connected at its front end to an arm 38 on the lever 22 and at its rear end to the arm 26, as at 39. The adjustment of the rod is shown at 40 and the connection 39 is shown as a pin and slot or lost motion connection. In the normal adjustment, the pin of said pin and slot connection is arranged near the middle of the slot so that the balanced connections between the rock shafts may be effective.

From this construction it will be seen that even though any or all of the connections other than the rod 37, arm 26, rock shaft 15 and rods 19 should fail, the two front brakes could be actuated by the foot lever 22. This corresponds to the arrangement by which the hand lever 24 may actuate the brakes 14 upon failure of all of the described connections other than the rod 33, arm 34, rock shaft 16, and rods 21, and yet the balanced action between the front and rear brakes is in no way interfered with in the normal operation of the service brake.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination with a front and a rear brake, a brake operating lever, and means connecting the lever to the brakes for operating said brakes with balanced action between them, of normally inoperative means for operating at least one of said brakes from said lever upon impairment of parts to an extent sufficient to destroy the balanced action.

2. In a motor vehicle, the combination with a pair of front brakes and a pair of rear brakes, an operating lever for said brakes, and means connecting the lever to the brakes for operating said brakes with balanced action between the pairs, of normally inoperative means for operating at least one of said pairs of brakes from said lever upon impairment of parts sufficient to destroy the balanced action.

3. In a motor vehicle, the combination with a pair of front brakes, a device for operating said brakes without equalization between them, a pair of rear brakes, a device for operating said rear brakes without equalization between them, an operating lever for all of said brakes, and means connecting said lever to said device for operating the brakes with balanced action between the devices, of normally inoperative means for operating at least one of said devices from said lever upon impairment or failure of parts that destroy the balanced action betwen said devices.

4. In a motor vehicle, the combination with two rock shafts for operating separate brakes, a lever, and means for rocking said shafts from said lever with balanced action between them, of a normally inoperative connection from said lever to one of said rock shafts for rocking that shaft upon impairment of the balanced action between them.

5. In a motor vehicle, the combination of front brakes and rear brakes, an operating lever, means connecting said lever to said brakes for operating the latter with balanced action between the front and rear brakes, and a second lever connected to one pair of brakes for operating them independently of the other pair of brakes, and normally inoperative means connected to operate said other pair of brakes upon failure of the brakes to which said second lever is connected.

6. In a motor vehicle, the combination with a pair of front brakes and a pair of rear brakes, an operating lever for said brakes, and means connecting the lever to the brakes for operating said brakes with balanced action between the pairs, of a normally inoperative connection between said lever and said front brakes for operating the front brakes upon failure of the rear brake connections.

7. In a motor vehicle, the combination with a pair of front brakes and a pair of rear brakes, of an operating lever, means connecting said lever to the brakes for operating them with balanced action between the pairs, a link having lost motion connections between said lever and the front brakes whereby said link is normally inoperative but will operate said front brakes upon the failure of said rear brake connections, a second lever and a connection from said second lever to the rear brakes for operating the latter independently of the other brakes and connections.

8. In a motor vehicle, the combination with two rock shafts for operating separate brakes, a lever, and means for rocking said shafts from said lever with balanced action between them, of normally inoperative means for operating at least one of said rock shafts upon impairment or failure of parts that destroy the balanced action between said shafts.

9. In a motor vehicle, the combination of a pair of front brakes and a pair of rear brakes, an operating lever for said brakes, means connecting the lever to the brakes for operating all of said brakes, and a normally inoperative connection between said lever and one of said pairs of brakes for operating the front brakes upon failure of the rear brake connections.

In testimony whereof I affix my signature.

MILTON TIBBETTS.